(12) United States Patent
Huang et al.

(10) Patent No.: US 8,572,285 B2
(45) Date of Patent: Oct. 29, 2013

(54) NETWORK EQUIPMENT AND METHOD FOR SELECTING COMMUNICATION PATH

(75) Inventors: Jia-Xuan Huang, New Taipei (TW); Ming-Chin Ho, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 31 days.

(21) Appl. No.: 13/272,232

(22) Filed: Oct. 13, 2011

(65) Prior Publication Data

US 2012/0246339 A1 Sep. 27, 2012

(30) Foreign Application Priority Data

Mar. 21, 2011 (CN) .......................... 2011 1 0067071

(51) Int. Cl.
*G06F 11/00* (2006.01)
(52) U.S. Cl.
USPC .......................................... 709/239; 370/230
(58) Field of Classification Search
USPC ......... 709/201, 211, 213, 239, 237, 236, 224, 709/226; 370/230
See application file for complete search history.

(56) References Cited

U.S. PATENT DOCUMENTS

| 4,204,196 | A | * | 5/1980 | Sveda | 340/309.9 |
|---|---|---|---|---|---|
| 8,295,167 | B2 | * | 10/2012 | Khaddam | 370/230 |
| 2003/0023746 | A1 | * | 1/2003 | Loguinov | 709/235 |
| 2006/0056426 | A1 | * | 3/2006 | Wakameda et al. | 370/401 |
| 2008/0165684 | A1 | * | 7/2008 | Sridharan et al. | 370/231 |
| 2012/0294177 | A1 | * | 11/2012 | Yan et al. | 370/252 |

* cited by examiner

*Primary Examiner* — Chandrahas Patel
*Assistant Examiner* — Lan Truong
(74) *Attorney, Agent, or Firm* — Altis & Wispro Law Group, Inc.

(57) ABSTRACT

A network equipment is in communication with customer premises equipment (CPE) through a primary electrical path and a secondary electrical path, and includes a timer, a processor and a switching device. The timer provides heartbeat packets for the CPE via the primary electrical path and the secondary electrical path to obtain a first response time and a second response time corresponding to the primary and secondary electrical paths. The switching device is switched to the primary electrical path or the secondary path under the control of the processor. When the timer reaches a preset retransmission timeout, the processor controls the switching device to be switched to the secondary electrical path from the primary electrical path. When the second response time exceeds the first response time at least twice in succession, the processor enables the switching device to be selectively switched to the primary electrical path.

16 Claims, 4 Drawing Sheets

NETWORK EQUIPMENT AND METHOD FOR SELECTING COMMUNICATION PATH

BACKGROUND

1. Technical field

The disclosure generally relates to computer networking, and more particularly to a network equipment and a method for selecting communication paths based on the stream control transmission protocol.

2. Description of the Related Art

Network equipments such as computer servers, routers and gateways usually communicate with corresponding customer premises equipments (CPEs) such as routers, switches, networking adaptors through different communication paths based on the stream control transmission protocol (SCTP). For example, when the computer server transmits messages to the router through different communication paths, the SCTP can place messages and control information into separate chunks (data chunks and control chunks) to ensure reliable and in-sequence transport of message with congestion control.

However, when any of the communication paths occurs abnormal termination or path failure due to link interrupted such as congestion packet loss, error code packet loss or time delay. Thus, the computer server will fail to switch over automatically to a standby or redundant communication path upon the failure or abnormal termination of the router in real-time, which may increase the packet loss ration of the information or data and reduce transmission rate and quality of the information or data.

Therefore, there is room for improvement within the art.

BRIEF DESCRIPTION OF THE DRAWINGS

Many aspects of a network equipment and method for selecting communication path can be better understood with reference to the following drawings. The components in the drawings are not necessarily drawn to scale, the emphasis instead being placed upon clearly illustrating the principles of the network equipment and the method for selecting communication path. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
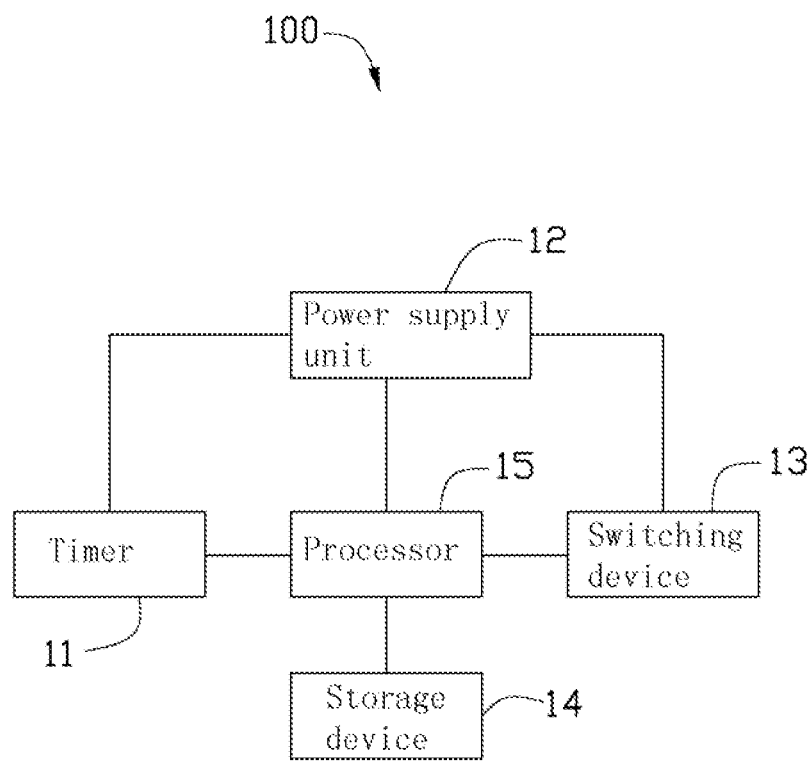
FIG. 1 is a block view of a network equipment according to one embodiment of the disclosure.

FIG. 1 shows a block view of a network equipment 100, according to one embodiment of the disclosure. In this embodiment, the network equipment 100 can be a router, gateway, switch, wireless network controller, base station, or mobile terminal.

Figure 2:
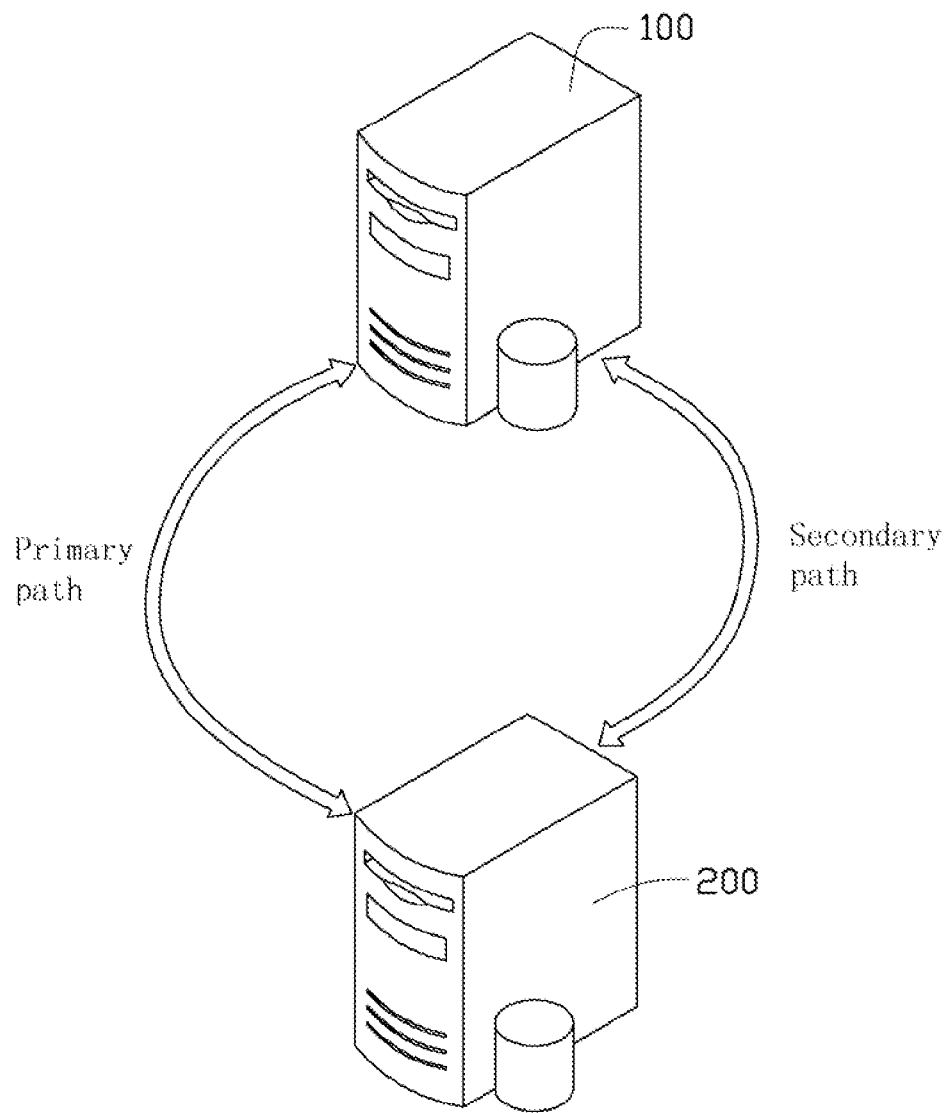
FIG. 2 is a schematic view of the network equipment in communication with a customer premises equipment through a primary path and a secondary path.

Referring to FIG. 2, the network equipment 100 is in electronic communication with a customer premises equipment (CPE) 200 through a primary path and a secondary path. In this embodiment, the CPE 200 can be a telephone, router, switch, residential gateway, home networking adaptor, or Internet access gateway which enables consumers to access the services of the communication service provider and distribute them around their house via a local access network.

The network equipment 100 can automatically select and switch corresponding communication paths (e.g., the primary path and the secondary path) to transfer message or data according to current computer network state, such as abnormal termination, path failure, congestion, and packet traffic. In this embodiment, the communication paths are electrical wired paths where the transmission of electronic data flows across. The network equipment 100 includes a timer 11, a power supply unit 12, a switching device 13, a storage device 14, and a processor 15. In this embodiment, the timer 11, the power supply unit 12, the switching device 13 and the storage device 14 are in electronic communication with the processor 15.

The timer 11 controls the sequence of an event or process, and measures and signals the end of time intervals. In this embodiment, the timer 11 can be an electromechanical digital timer, or electronic digital timer. When the network equipment 100 sends messages to the CPE 200 through the primary path, the timer 11 starts to time from a specified time interval; and when the network equipment 100 sends messages to the CPE 200 through the secondary path, the timer 11 synchronously sends heartbeat packets to the CPE 200 through the primary path and the secondary path based on the stream control transmission protocol (SCTP) that ensures reliable and in-sequence transport of message with congestion control. The timer 11 receives feedback response signals corresponding to the heartbeat packets via the primary path and the secondary path, and calculates and records response time of the primary path and the secondary path.

In this embodiment, the heartbeat packet is an ordinary transfer control protocol (TCP)/Internet protocol (IP) acknowledgement packet without any piggybacking data and is usually used to complete the auxiliary work of applications, and used to detect the existence of network connections, or check for patches and updates. The heartbeat packet includes packet contents, timing, and retry counts, and can be generally recognized based on timing characteristics, packet size, payload content, and a set of protocol related properties. The response time of the primary path is defined as a first response time T1 that presents a time interval between the transmitted heartbeat packet and the received response signal of the primary path. The response time of the secondary path is defined as a second response time T2 that presents a time interval between the transmitted heartbeat packet and the received response signal of the secondary path.

The power supply unit 12 is in electronic communication with the timer 11, the switching device 13 and the processor 15. In this embodiment, the power supply unit 12 converts one form of power to another, and supplies power to the timer 11, the switching device 13 and the processor 15.

In this embodiment, the switching device 13 can be an analog switch or an electronic switch. The switching device 13 is capable of selectively switching to the primary path or the secondary path under the control of the processor 15. For example, when the processor 15 sends a command signal to the switching device 13, the switching device 13 then is switched over to the secondary path from the primary path.

The storage device 14 can be a read only memory (ROM) or random access memory (RAM), which is a class of storage medium used to store message or data. In this embodiment, the storage device 14 prestores a comparison count EA-count and an error count ERR-count, and the initial values of the comparison count EA-count and the error count ERR-count are reset to zero.

The processor 15 can be a microprocessor or microcontroller, which carries out the functions of the network equipment 100, to perform the basic arithmetical, logical, and input/output operations to further control the timer 11, the switching device 13 and the storage device 14. In this embodiment, when the timer 11 reaches a predetermined retransmission timeout (RTO), the processor 15 then provides and sends a first command signal to the switching device 13, the switching device 13 is selectively switched to the secondary path from the primary path. Thus, the network equipment 100 communicates with the CPE 200 through the secondary path.

The processor 15 is further capable of comparing the first response time T1 with the second respond time T2, and controlling the switching device 13 according to comparison results. In this embodiment, if the processor 15 determines the first response time T1 is less than the second response time T2 many times in succession (e.g., twice consecutive), which indicates that the communication quality of the primary path is more available than that of the secondary path, and the primary path can receive the feedback response signals more quickly than the secondary path, the processor 15 provides and sends a second command signal to the switching device 13, enabling the switching device 13 to be selectively switched to the primary path. Thus, the network equipment 100 communicates and transfers data with the CPE 200 through the primary path.

If the processor 15 determines the first response time T1 is greater than the second response time T2, that signifies that the communication quality of the secondary path is more available than the primary path, and the secondary path can receive the feedback response signals more quickly than the primary path, the processor 15 enables and resets the comparison count EA-count to zero, and the network equipment 100 maintains data transmission and communication with the CPE 200 through the secondary path. If the first response time T1 and the second response time T2 are greater than the RTO value, which signifies that the communication quality of the primary path and the secondary path are poor, the processor 15 controls the storage device 14 to enable the error count ERR-count to add by one. If the processor 15 determines the error count ERR-count exceeds a preset threshold value in the storage device 14, which signifies that the primary path and the secondary path are inaccessible, the network equipment 100 fails to communicate with the CPE 200, and stops transferring data.

Figure 3A:
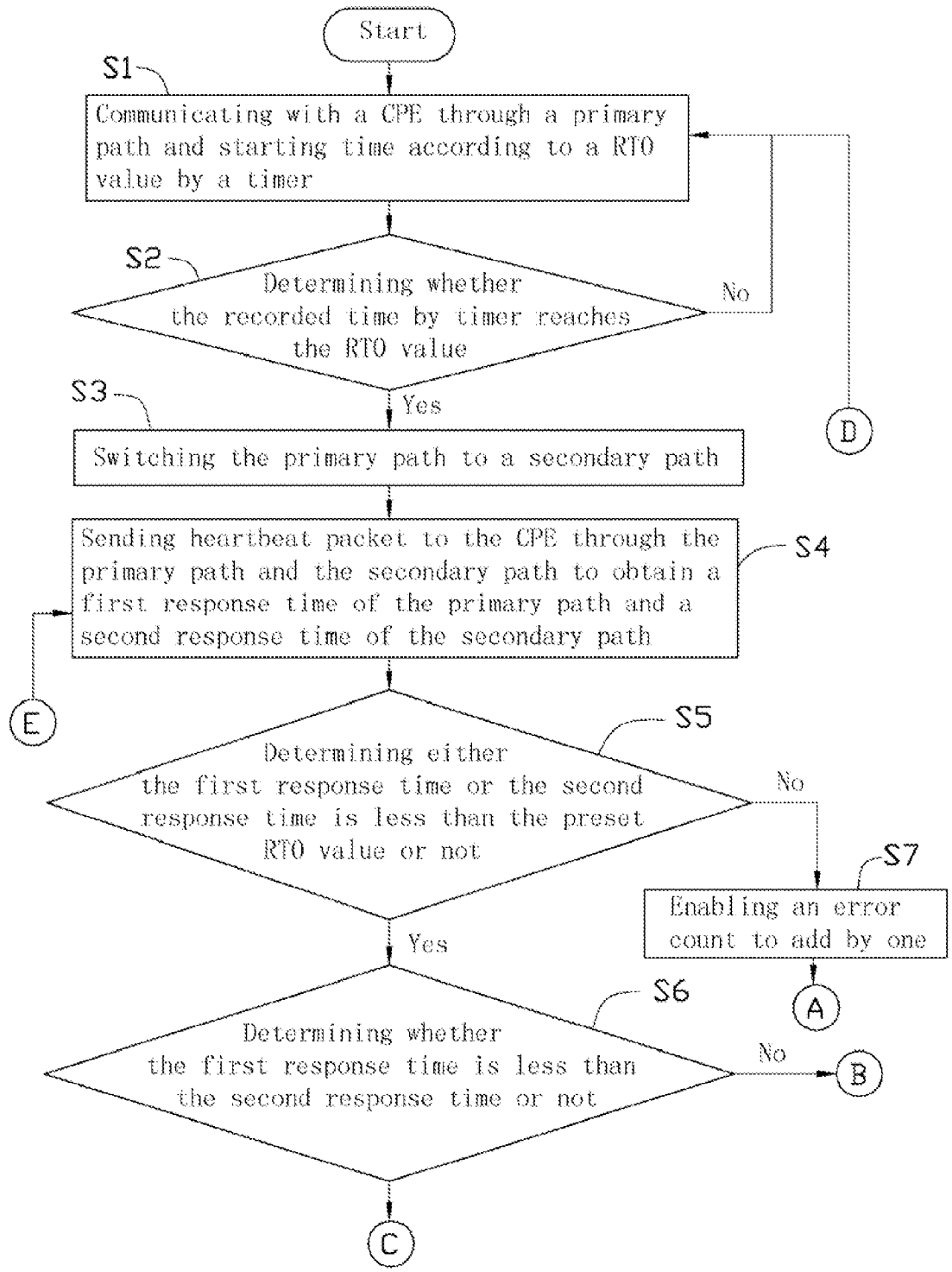
FIGS. 3A and 3B are flowcharts illustrating a method for selecting communication paths, according to an embodiment of the disclosure.
Figure 3B:
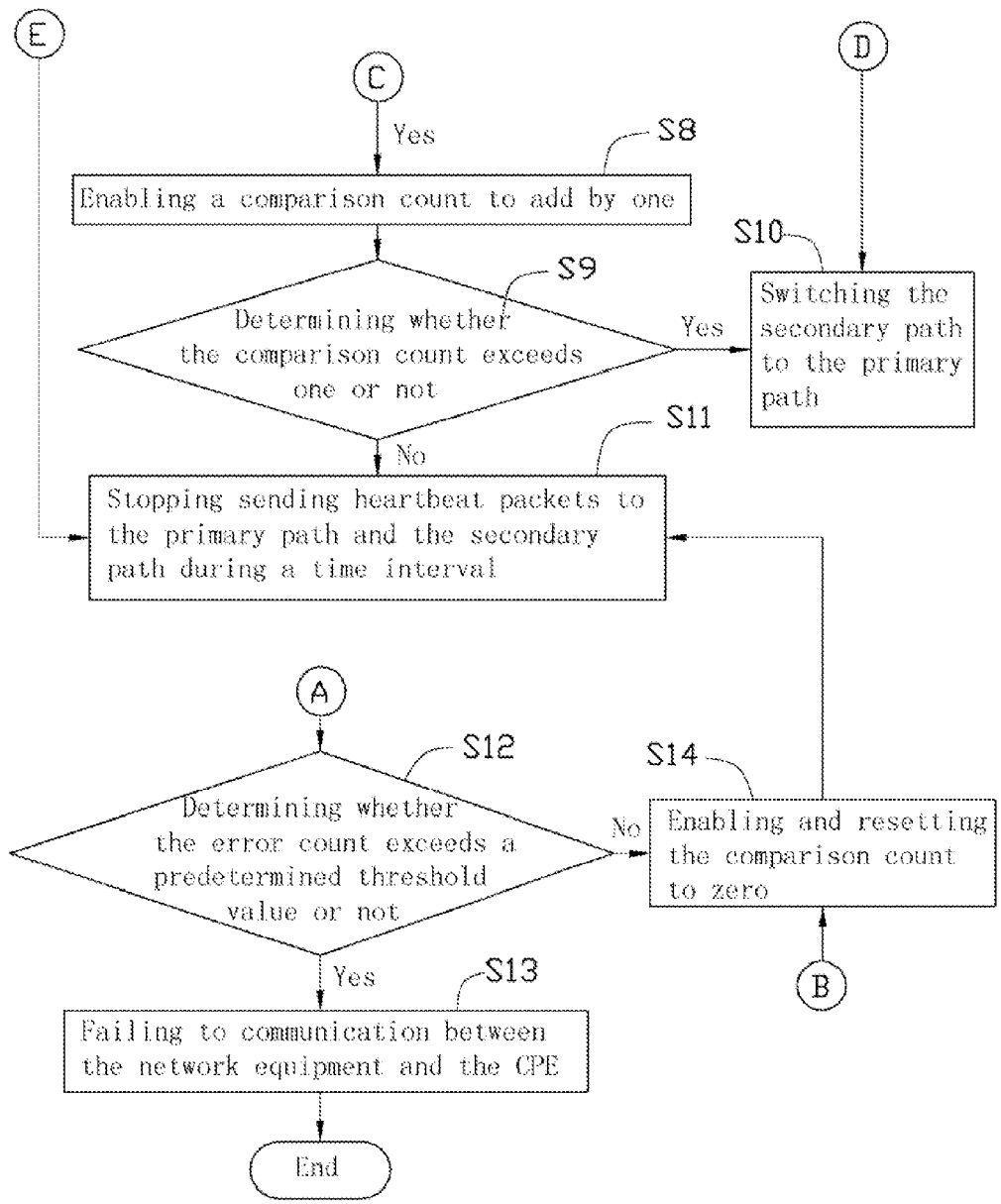

Also referring to FIGS. 3 and 4, a method for selecting communicating paths according to one embodiment of the disclosure is depicted. The method can use the aforementioned network equipment 100, and may include at least the following steps.

In step S1, the network equipment 100 communicates and transfers data with the CPE 200 through the reset primary path, and the timer 11 starts to record time according to the RTO value, such as 10 seconds.

In step S2, the processor 15 determines whether the timer 11 reaches the RTO values or not. If the timer 11 fails to exceed the RTO value, then step S1 is repeated, and the network equipment 100 continues to communicate with the CPE 200 via the primary path; if the timer 11 exceeds the RTO values, that is, the recorded time by the timer 11 is overtime, the processor 15 sends the first command signal to the switching device 13, then the method proceeds to step S3.

In step S3, the switching device 13 receives the first command signal from the processor 15, and is switched to the secondary path, and the network equipment 100 communicates with the CPE 200 through the secondary path.

In step S4, the timer 11 of the network equipment 100 sends heartbeat packets to the CPE 200 through the primary path and the secondary path based on the SCTP, and receives the feedback response signals corresponding to the heartbeat packets through the primary path and the secondary path, and calculates and records the first response time T1 of the primary path and the second response time T2 of the secondary path.

In step S5, the processor 15 compares the first response time T1 and the second response time T2 with the predetermined RTO value. If either the first response time T1 or the second response time T2 is less than the predetermined RTO value, then the method proceeds to step S6; if neither the first response time T1 nor the second response time T2 is less than the preset RTO value, then the method proceeds to step S7.

In step S6, the processor 15 compares the first response time T1 with the second response time T2. If the first response time T1 is less than or equal to the second response time T2, then the method proceeds to step S8; if the first response time T1 exceeds the second response time T2, then the method proceeds to step S14.

In step S7, since the first response time T1 and the second response time T2 are greater than or equal to the RTO value, the processor 15 controls the storage device 14 to enable the error count ERR-count to add by one.

In step S8, the processor 15 controls the storage device 14 to enable the comparison count EA-count to add by one.

In step S9, the processor 15 determines whether the comparison count EA-count is greater than one or not, such as the comparison count EA-count is two. If the comparison count EA-count exceeds one, then the method proceeds to step S10; if the comparison count EA-count is equal to one, then the method proceeds to step S11.

In step S10, since the first response time T1 is less than the second response time T2 many times in succession (e.g., twice), which signifies that the communication quality of the primary path is more accessible than that of the secondary path, and the primary path can receive the feedback response signals more quickly than the secondary path. In this embodiment, the processor 15 sends the second command signal to the switching device 13, enabling the switching device 13 to be selectively switched to the primary path, then step S1 is repeated, and the network equipment 100 communicates and transfers data with the CPE 200 through the primary path.

In step S11, the timer 11 stops sending heartbeat packets to the primary path and the secondary path during a time interval (e.g., 1 sec., 2 secs. or 2.5 secs.), then the method proceeds to step S4.

In step S12, the processor 15 determines whether the error count ERR-count exceeds the preset threshold value in the storage device 14 or not. If the error count ERR-count exceeds the preset threshold value, which signifies that the primary path and the secondary path are inaccessible, then the method proceeds to step S13; if the error count ERR-count is less than or equal to the preset threshold value, then the method proceeds to step S14.

In step S13, since the first response time T1 and the second response time T2 are greater than or equal to the RTO value according to continuous comparisons, which signifies that the communication paths are unavailable, so the network equipment 100 fails to communicate with the CPE 200, and stops transferring data.

In step S14, the processor 15 controls the storage device 14 to enable and reset the comparison count EA-count to zero, then step S11 is repeated.

In summary, in the network equipment 100 of this present disclosure, the timer 11 can send heartbeat packets to the primary path and the secondary path based on the SCTP, and receives the feedback response signals corresponding to the heartbeat packets through the primary path and the secondary path to obtain the first response time T1 and the second response time T2. Thus, the processor 15 compares the first response time T1 with the second response time T2 to selectively and automatically turn on the primary path or the secondary path, which can ensure reliable and in-sequence transport of data with congestion control. In addition, the network equipment 100 can automatically switch over one communication path in real-time when one of the primary path and the secondary path occurs abnormal termination or path failure due to link interrupted such as error code packet loss, congestion packet loss, or time delay, which may reduce the packet loss ration of the data and increase transmission rate and quality of the data.

In the present specification and claims, the word "a" or "an" preceding an element does not exclude the presence of a plurality of such elements. Further, the word "comprising" does not exclude the presence of elements or steps other than those listed.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of this exemplary disclosure to the full extent indicated by the broad general meaning of the terms in which the appended claims are expressed.

What is claimed is:

1. A computerized method for selecting an electronic communication path between a network equipment and a customer premise equipment (CPE), the network equipment comprising a timer and processor, the method comprising steps of:
    communicating with the CPE through a primary path by the network equipment and starting to time according to a retransmission timeout (RTO) value by the timer of the network equipment, wherein the path is an electrical wired path where the transmission of electronic data flows across;
    determining whether the recorded time reaches the RTO value by the processor;
switching the primary path to a secondary path when the timer exceeds the RTO value;
sending a heartbeat packet to the CPE through the primary path and the secondary path to obtain a first response time of the primary path and a second response time of the secondary path;
    comparing the first response time and the second response time with the preset RTO value;
    comparing the first response time with the second response time when either the first response time or the second response time is less than the preset RTO value;
    enabling a comparison count to add by one when the first response time is less than or equal to the second response time;
    determining whether the comparison count exceeds one or not; and
    switching the secondary path to the primary path when the second response time exceeds the first response at least twice in succession.

2. The computerized method for selecting communication path as claimed in claim 1, wherein when the timer fails to exceed the RTO value, the step of communicating with the CPE through the primary path by the network equipment and starting time according to the RTO value by the timer of the network equipment is repeated.

3. The computerized method for selecting communication path as claimed in claim 1, further comprising enabling an error count to add by one when neither the first response time nor the second response time is less than the preset RTO value.

4. The computerized method for selecting communication path as claimed in claim 1, further comprising stopping sending heartbeat packets to the primary path and the secondary path during a time interval when the comparison count is equal to one.

5. The computerized method for selecting communication path as claimed in claim 3, further comprising determining whether the error count exceeds a preset threshold value or not.

6. The computerized method for selecting communication path as claimed in claim 5, further comprising failing to communicate with the CPE and stopping transferring data when the error count exceeds the preset threshold value.

7. The computerized method for selecting communication path as claimed in claim 5, further comprising enabling and resetting the comparison count to zero when the error count is less than or equal to the preset threshold value.

8. A network equipment in electronic communication with a customer premises equipment (CPE) through a primary electrical path and a secondary electrical path, the network equipment comprising:
    a timer for providing heartbeat packets for the CPE through the primary electrical path and the secondary electrical path, and obtaining a first response time and a second response time corresponding to the primary electrical path and the secondary electrical path;
    a processor in electronic communication with the timer, the processor comparing the first response time and the second response time with the preset RTO value;
comparing the first response time with the second response time when either the first response time or the second response time is less than the preset RTO value; enabling a comparison count to add by one when the first response time is less than or equal to the second response time and determining whether the comparison count exceeds one or not; and
    a switching device in electronic communication with the processor, wherein the switching device is selectively switched to the primary electrical path or the secondary electrical path under the control of the processor, when the timer reaches a predetermined retransmission timeout (RTO), the processor controls the switching device to be switched to the secondary electrical path from the primary electrical path, when the second response time exceeds the first response time at least twice in succession, the processor enables the switching device to be selectively switched to the primary electrical path.

9. The network equipment as claimed in claim 8, wherein the timer is an electronic digital timer or electromechanical digital timer, when the network equipment sends messages to the CPE through the primary electrical path, the timer starts time;
    when the network equipment sends message to the CPE via the secondary path, the timer synchronously sends heartbeat packets to the CPE through the primary electrical path and the secondary electrical path based on the stream control transmission protocol, and the timer receives feedback response signals corresponding to the heartbeat packets via the primary electrical path and the secondary electrical path, and calculates and records response time of the primary electrical path and the secondary electrical path.

10. The network equipment as claimed in claim 8, wherein the heartbeat packet is used to complete the auxiliary work of applications, and used to detect the existence of network connections, or check for patches and updates, and includes packet contents, timing, and retry counts, and can be generally recognized based on timing characteristics, packet size, payload content, and a set of protocol related properties.

11. The network equipment as claimed in claim 8, further comprising a storage device in electronic communication with the processor, wherein the storage device is a read only memory or random access memory, and the storage device prestores the comparison count and an error count, and the initial values of the comparison count and the error count are reset to zero.

12. The network equipment as claimed in claim 11, wherein the processor can be a microprocessor or microcontroller, the processor carries out the functions of the network equipment to control the timer, the switching device and the storage device, when the timer reaches the predetermined RTO value, the processor provides and sends a first command signal to the switching device, the switching device is selectively switched to the secondary electrical path from the primary electrical path, and the network equipment communicates with the CPE through the secondary path.

13. The network equipment as claimed in claim 8, wherein when the processor determines the first response time is less than the second response time at least twice in succession, the processor provides and sends a second command signal to the switching device, enabling the switching device to be selectively switched to the primary electrical path, and the network equipment communicates and transfers data with the CPE through the primary electrical path.

14. The network equipment as claimed in claim 11, wherein when the processor determines the first response time exceeds the second response time, the processor enables and resets the comparison count to zero, and the network equipment maintains data transmission and communication with the CPE through the secondary path.

15. The network equipment as claimed in claim 11, wherein when the first response time and the second response time exceed the RTO value, the primary electrical path and the secondary electrical path are poor, and the processor controls the storage device to enable the error count to add by one.

16. The network equipment as claimed in claim 11, wherein when the processor determines the error count exceeds a preset threshold value in the storage device, the primary electrical path and the secondary electrical path are inaccessible, the network equipment fails to communicate with the CPE and stops transferring data.

* * * * *